United States Patent

Bilsing et al.

[11] Patent Number: 5,324,237
[45] Date of Patent: Jun. 28, 1994

[54] BELT DRIVE FOR ELECTRICAL MACHINES

[75] Inventors: Thomas Bilsing, Bietigheim; Johann Kunz, Sersheim; Hermann Lehnertz, Oberriexingen; Hans-Joachim Lutz, Lampertheim; Johann Koeppel, Bissingen/Enz; Martin Leins, Schwieberdingen, all of Fed. Rep. of Germany

[73] Assignee: Robert Bosch GmbH, Stuttgart, Fed. Rep. of Germany

[21] Appl. No.: 996,657

[22] Filed: Dec. 24, 1992

[30] Foreign Application Priority Data

Jan. 25, 1992 [DE] Fed. Rep. of Germany ....... 4202001

[51] Int. Cl.$^5$ ............................................. F16D 3/04
[52] U.S. Cl. ...................................... 474/94; 474/903
[58] Field of Search ............... 474/148, 150, 170, 238, 474/273, 903, 94

[56] References Cited

U.S. PATENT DOCUMENTS

| | | |
|---|---|---|
| 1,900,208 | 3/1933 | Swank . |
| 3,377,875 | 4/1968 | Sand ...................................... 474/94 |
| 3,952,546 | 4/1976 | Nakano et al. . |
| 4,421,998 | 12/1983 | Ahner et al. ...................... 310/68 R |
| 4,433,744 | 2/1984 | Muhlbacher ...................... 180/65 E |
| 4,787,678 | 11/1988 | Holmes et al. ................... 474/903 X |
| 5,163,883 | 11/1992 | Bradfield ........................ 474/903 X |

FOREIGN PATENT DOCUMENTS

| | | |
|---|---|---|
| 0167180 | 1/1986 | European Pat. Off. . |
| 3030701 | 3/1982 | Fed. Rep. of Germany . |
| 4035583 | 5/1992 | Fed. Rep. of Germany . |

Primary Examiner—Ramon S. Britts
Assistant Examiner—Roger J. Schoeppel
Attorney, Agent, or Firm—Michael J. Striker

[57] ABSTRACT

A belt drive of an electrical machine has a belt pulley arranged on a driving end of a machine shaft, a coupling connecting the drive pulley with the machine shaft, the coupling having at least one elastic coupling part provided between a driving side and a driven side of the coupling, a mounting part having a bearing pin and mountable on a machine aggregate which is connected with the electrical machine, a drive belt connecting the mounting part with the machine aggregate, and an inner bearing. The belt pulley in order to take up belt pull forces, is mounted through the inner bearing on the bearing pin of the mounting part which is mountable on the machine aggregate through the drive belt.

14 Claims, 2 Drawing Sheets

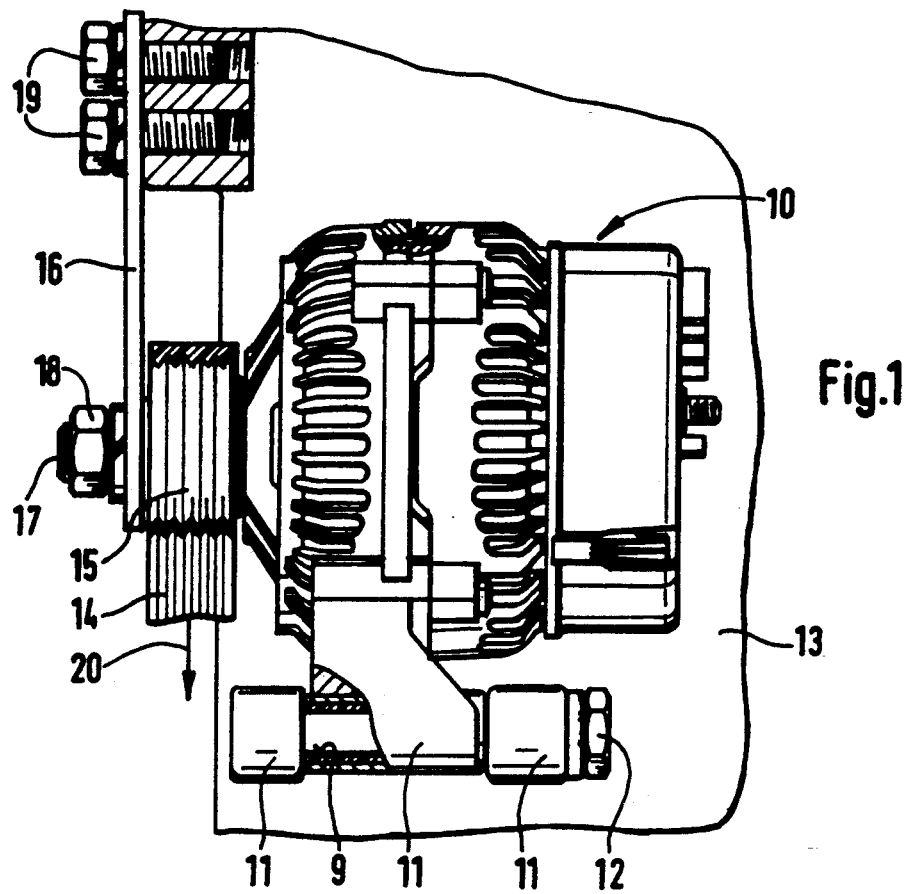
Fig.1
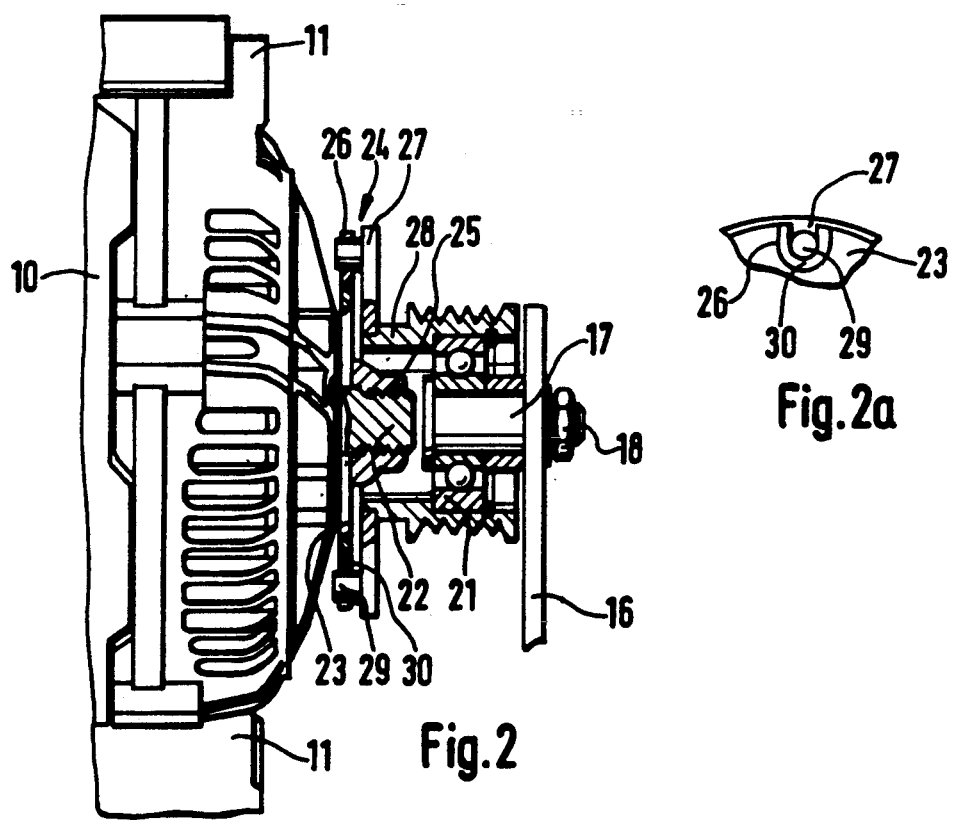
Fig.2
Fig.2a

BELT DRIVE FOR ELECTRICAL MACHINES

BACKGROUND OF THE INVENTION

The present invention relates to a belt drive for an electrical machine, which is for example a three-phase generator for a motor vehicle.

In particular it relates to a belt dive in which a belt pulley is arranged on a drive end of a machine shaft and connected with the latter through a coupling.

Belt drives for electrical machines of the above mentioned general type are known in the art. One of such belt drives for a three-phase generators for a motor vehicle id disclosed for example in the German document DE 30 30 701 A1. In this belt drive the belt pulley together with a drive-side coupling part of a friction coupling is supported on the drive shaft of the generator. The driven coupling part is fixed on the drive shaft. With the above described solution the generator with the belt pulley and the wedge belt must be exactly oriented relative to one another during the mounting. The movements of the generator during the operation lead to increased wear of the wedge belt or the belt pulley and eventually to their destruction.

For obtaining a noise dampening in motor vehicles, it becomes increasingly known to mount the generator on the housing block of the internal combustion engine through an elastic bearing. This for example uncouples the magnetic noise of the three-phase generator in lower three-phase region from the motor block. In this construction it is necessary to prevent inclination of the generator toward the drive side under the action of the pulling of the belt pulley due to the elastic mounting of the generator.

SUMMARY OF THE INVENTION

Accordingly, it is an object of the present invention to provide an belt drive for electrical machines which avoids the disadvantages of the prior art.

More particularly, it is an object of the present invention to provide a belt drive which in a maximum simple manner is supported so that a belt pull can no longer act on an end of the drive shaft of the three-phase generator.

In keeping with these objects and with others which will become apparent hereinafter, one feature of the present invention resides, briefly stated, in a belt drive for an electrical machine in which the coupling has an elastic coupling part between a driven side and a drive side of the coupling, and for taking up the belt pull forces the belt pulley is mounted through an inner bearing on a bearing pin of a mounting part which is mounted on a machine aggregate connecting the belt with the electrical machine, for example the drive motor of a motor vehicle.

When the belt drive is designed in accordance with the present invention, the wedge belt driven by the internal combustion engine transmits the torque through the elastic coupling not only to the drive shaft of the three-phase generator and the belt pull forces acting on the belt pulley are taken up through the bearing of the belt pulley by the mounting part fixed on the machine aggregate. Due to the elastic coupling between the belt pulley and the drive shaft of the light machine, also in advantageous manner axial tolerances of the elastic mounting of the three-phase generator and light movements of the elastically suspended generator during the operation are taken up. An especially simple and advantageous support of the belt pulley is therefore obtained when the belt pulley is received by an inner bearing which is supported on the bearing pin mounted on the mounting part.

In accordance with another feature of the present invention, when a so-called poly-V-belt pulley is utilized, it is advantageous when the end of the bearing pin for the belt pulley is located close before the end of the machine shaft, on which a driver of the elastic coupling is mounted and connected at least through one elastic coupling part with the belt pulley. In this solution the shaft end of the three-phase generator can be very short since it carries only the driven-side coupling part with the driver and therefore a compact construction required in motor vehicles is obtained.

It is especially advantageous when the driver mounted on the end of the machine shaft is formed as a disc having a plurality of recesses distributed over the periphery, and a pin of a second disc mounted on the end of the belt pulley are releasably and axially displaceably engaged in the recesses with interposition of rubber parts. Such a construction allows substantial axial displacements of the machine shaft relative to the belt pulley and allows correspondingly great axial mounting tolerances.

The orientation of the belt pulley with respect to the wedge belt is performed in the present invention exclusively through the mounting part for the belt pulley which is mounted adjustably on the machine aggregate. This mounting part in accordance with an advantageous feature of the present invention can be formed as a latch which has one end supporting the bearing pin of the belt pulley and another end releasably and adjustably supporting the machine aggregate.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a three-phase generator on a housing block of an internal combustion engine with a stepped belt pulley of a belt drive in accordance with the present invention;

FIG. 2 is a view showing a first embodiment of the stepped belt pulley with an arresting coupling on the drive shaft of the three-phase generator;

FIG. 2a is a view showing a fragment of the elastic coupling of FIG. 2; and

DESCRIPTION OF THE PREFERRED EMBODIMENTS

Figure 3:
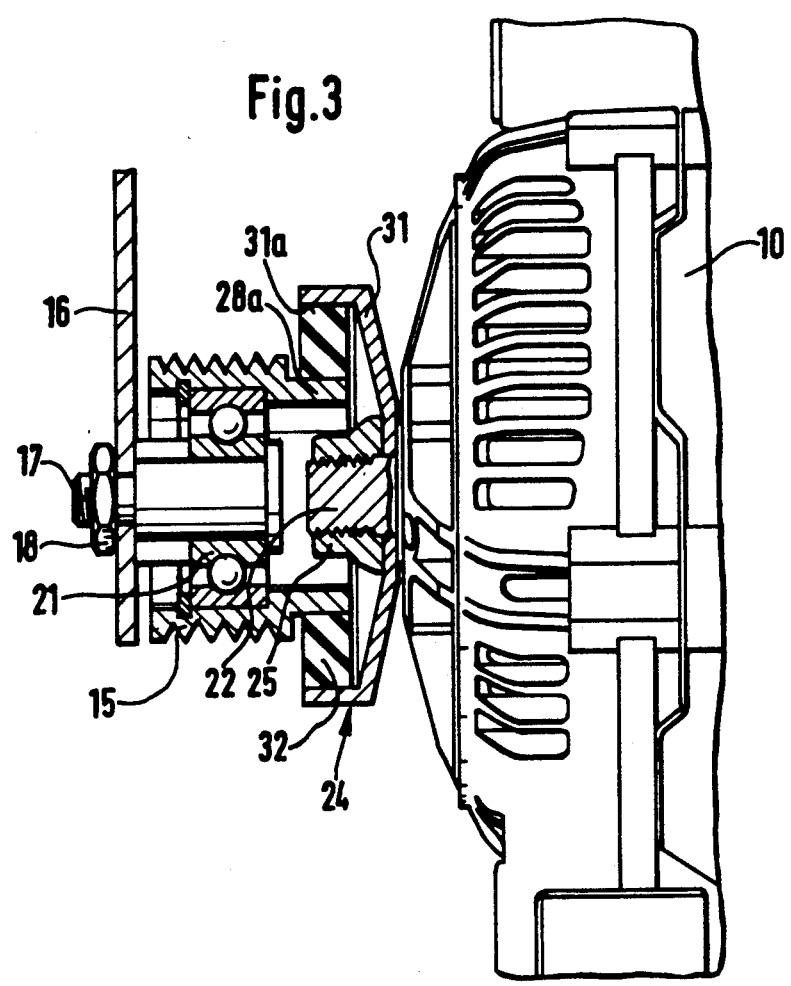
FIGS. 3 and 4 are views showing further embodiments of a stepped poly-V-belt pulley with an elastic coupling which is releasably mounted on a shaft end of a three-phase electrical machine.

A three-phase generator shown in FIG. 1 is identified with reference numeral 10. It is mounted on a housing 13 of an internal combustion engine aggregate (motor block) by several bearing ears 11 and bearing pins 12. Damping bushings 9 are provided in the bearing gears 11 and used for a noise decoupling of the generator 10 from the motor housing 13. The generator 10 is driven by the internal combustion engine through a so-called poly-V-belt 14 by means of a belt pulley 15 arranged on a driving-side end of the generator 10.

A mounting part which is formed as a mounting bracket 16 supports the belt pulley through a not shown bearing and a bearing pin 17 which is screwed at one end of the mounting bracket 16 with a nut 18. The other end of the mounting bracket 16 is adjustably mounted on a motor housing 13 by screws 19. The belt pulley 15 and the belt 14 are oriented relative to one another by the mounting bracket 16. The pulling force of the belt 14 oriented substantially in direction of the arrow 20 downwardly is taken up by the upwardly extending mounting bracket 16. Therefore only a torque which is transmitted through the belt 14 driven by the internal combustion engine acts on the drive shaft of the generator 10. The belt pulley 15 is connected with the drive shaft of the generator 10 through a not shown elastic coupling. Several embodiments of the releasable elastic coupling on the end of the drive shaft of the generator 10 and also of the bearing of the belt pulley 15 are illustrated in FIGS. 2-4.

In FIG. 2 the belt pulley 15 on its inner side is arranged on an outer ring of a ball bearing 21. The inner ring of the ball bearing 21 is mounted on the bearing pin 17 which is screwed on the mounting bracket 16 and thereby secured from an axial displacement. The end of the drive shaft 22 of the three-phase generator shown in section is located closely in front of the end of the bearing pin 17. A driver disc 23 which forms a driver of an elastic coupling 24 is fixed by screwing on the end of the drive shaft 22 by means of a nut 25. The driver disc 23 has a plurality of recesses 26 distributed over its periphery. A further disc 27 is located forwardly of the driver disc 23 which forms the driven part of the coupling 24 with an axial air gap therebetween. The disc 27 forms a driving part of the coupling 24 and is mounted on a front axial projection 28 of the belt pulley 15. Pins 29 are mounted on the periphery of the disc 27 and axially project from it. They engage in the correspondingly arranged recesses 26 of the driver disc 23. U-shaped rubber members 30 are inserted between the pins 29 and the recesses 26.

FIG. 2a shows a fragment of the coupling 24 in the region of one recess 26 of the driver disc 23 with one rubber member 30 and the pin 29 of the disc 27 is inserted in the recess. In this embodiment of the elastic coupling 24, mounting tolerances as well as light movements of the generator 10 including axial movements or pitching movements of the generator during the operation are taken up without being transmitted to the belt pulley 15. Moreover, due to the coupling 24 the belt pulley 15 is removed from the motor housing 13 by unscrewing of the mounting bracket 16 and the new wedge belt is provided.

Figure 4:
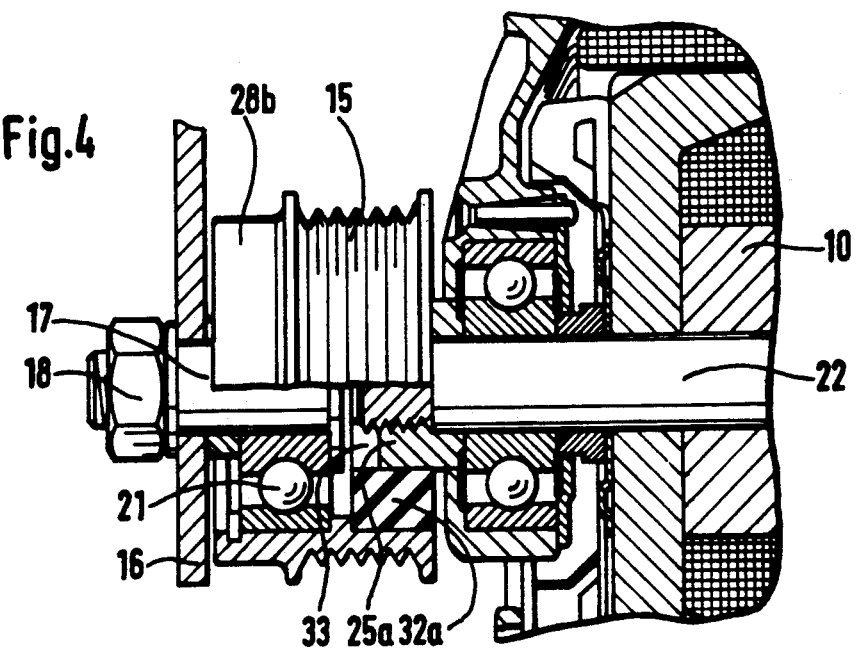

In the embodiment of FIG. 3 the driving-side coupling part is composed of a front axial ring-shaped projection 28a of the belt pulley 15, which extends into a cup-shaped driver 31. The cup-shaped driver 31 is fixed by means of a nut 25 on the end of the drive shaft 22 of the generator 10. A rubber ring 32 forming an elastic coupling part is vulcanized between the inner wall 31a of the cup-shaped drive 31 and the projection 28a of the belt pulley 15 which extends into it. Also in this embodiment through the elastic coupling 24, only the torque is transmitted from the wedge rim to the drive shaft 22 of the generator 10, and during replacement of the wedge belt the mounting bracket 16 is unscrewed from the motor housing 13.

In the embodiment of FIG. 4 the front end of the belt pulley 15 extends over a nut 25a which is screwed on the end of the drive shaft 22 of the generator 10. The nut 25a has at its front end four cross-shaped slots 33 for engagement of a tool. It is fixed by screwing with a thread on the shaft end of the drive shaft 22 so that the nut 25a is tightened by a torque transmitted by the wedge belt (with a left thread if the generator runs in a left direction or a right thread when the generator runs in a right direction).

A rubber ring 32a is vulcanized between the outer periphery of the nut 25a and the inner side of the portion of the belt pulley 15 which extends over the nut 25a. The rubber ring 32a is formed as an elastic coupling part and transfers the torque from the belt pulley 15 to the drive shaft 22. In deviation from the belt pulley 15 of FIG. 4 it is also possible to arrange the projection 28b not on the side facing the ball bearing 21, but instead on the side directed to the generator 10, so that the region which supports the wedge belt 14 is directly supported by the ball bearing 21. In this case the rubber ring 32a is vulcanized between the nut 25a which is mounted on the shaft spigot of the drive shaft 22 and the projection 28b.

When the belt drive is designed in accordance with the present invention, it is not necessarily required to mount the electrical machine on the motor block or the machine aggregate. When it is mounted on other parts, attachments or the like, an unloading of the machine shaft from the belt forces of the belt drive is also possible as long as the mounting part with the belt pulley supported on it is mounted on the aggregate which is connected through the drive belt with the electrical machine. The electrical machine can be also a motor which drives the aggregate.

It will be understood that each of the elements described above, or two or more together, may also find a useful application in other types of constructions differing from the types described above.

While the invention has been illustrated and described as embodied in a belt drive, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A belt drive of an electrical machine, comprising a belt pulley arranged on a driving end of a machine shaft; a coupling connecting said belt pulley with the machine shaft, said coupling having at least one elastic coupling part provided between a driving side and a driven side of said coupling; a mounting part having a bearing means and mountable on a machine aggregate which is connected with the electrical machine; a drive belt connecting said electrical machine with the machine aggregate; and an inner bearing, said belt pulley, in order to take up belt pull forces, being mounted through said inner bearing on said bearing means of said mounting part which is mountable on the machine aggregate through said drive belt.

2. A belt drive as defined in claim 1, wherein the electrical machine is a three-phase generator for a motor vehicle.

3. A belt drive as defined in claim 1, wherein said machine aggregate is a drive motor of a motor vehicle.

4. A belt drive as defined in claim 1, wherein said belt is poly-V-belt and said belt pulley is formed for said poly-V-belt, said inner bearing being formed as a ball bearing through which said belt pulley is supported on said bearing pin, said bearing means is a bearing pin having an end located forwardly of said end of said machine shaft, said elastic coupling having a driver which is mounted on said end of said bearing pin and connected with said belt pulley through said elastic coupling part.

5. A belt drive as defined in claim 4, wherein said driver is formed as a driver disc provided with a plurality of recesses distributed over its periphery; and further comprising a further disc mounted on an end of said belt pulley and provided with a plurality of pins which are releasably and axially displaceably inserted in said recesses.

6. A belt drive as defined in claim 5; and further comprising a plurality of rubber members, said pins being inserted in said recesses with interposition of said rubber members.

7. A belt drive as defined in claim 5, wherein said belt pulley has a front axial projection, said further disc of said elastic coupling being mounted on said front axial projection.

8. A belt drive as defined in claim 4, wherein said driver mounted on said end of the machine shaft is cup-shaped, said belt pulley having a front axial projection extending into said cup-shaped driver.

9. A belt drive as defined in claim 8, wherein said driver has an inner wall; and further comprising a rubber ring vulcanized between said inner wall of said driver and said projection of said belt pulley.

10. A belt drive as defined in claim 4; and further comprising a nut mounted on said end of the machine shaft and having an outer periphery, said belt pulley having a front part extending over said nut and having a portion which projects beyond said nut and has an inner side.

11. A belt drive as defined in claim 10; and further comprising a rubber ring vulcanized between said outer portion of said nut and said inner side of said portion of said belt pulley projecting beyond said nut.

12. A belt drive as defined in claim 1, wherein said mounting part is formed a a mounting bracket having two ends, said bearing pin of said belt pulley being mounted on one end of said mounting bracket, while another end of said mounting bracket is releasably and adjustably mountable on the machine aggregate.

13. A belt drive as defined in claim 12, wherein said mounting bracket is mountable on the machine aggregate in a position oriented substantially in a belt pull direction.

14. A belt drive as defined in claim 1; and further comprising at least one elastic bush mounting the electrical machine on the machine aggregate in a noise isolating manner.

* * * * *